(12) United States Patent
Kilinski

(10) Patent No.: US 11,219,171 B2
(45) Date of Patent: Jan. 11, 2022

(54) APPARATUS AND METHOD FOR DETERMINING TREE FALL DIRECTION

(71) Applicant: Tree Felling Innovations LLC, Newburg, MD (US)

(72) Inventor: Myer A. Kilinski, Newburg, MD (US)

(73) Assignee: Tree Felling Innovations LLC, Newburg, MD (US)

( * ) Notice: Subject to any disclaimer, the term of this patent is extended or adjusted under 35 U.S.C. 154(b) by 408 days.

(21) Appl. No.: 16/265,439

(22) Filed: Feb. 1, 2019

(65) Prior Publication Data

US 2020/0245571 A1 Aug. 6, 2020

(51) Int. Cl.
| | |
|---|---|
| *A01G 23/099* | (2006.01) |
| *A01G 23/08* | (2006.01) |
| *G01B 3/56* | (2006.01) |
| *G01B 11/26* | (2006.01) |
| *G01C 15/00* | (2006.01) |
| *G01C 15/12* | (2006.01) |

(52) U.S. Cl.
CPC ........... *A01G 23/099* (2013.01); *A01G 23/08* (2013.01); *G01B 3/56* (2013.01); *G01B 11/26* (2013.01); *G01C 15/002* (2013.01); *G01C 15/12* (2013.01)

(58) Field of Classification Search
CPC .................................................. A01G 23/099
USPC ............................................. 33/286, DIG. 21
See application file for complete search history.

(56) References Cited

U.S. PATENT DOCUMENTS

| | | | | | |
|---|---|---|---|---|---|
| 5,461,793 | A | * | 10/1995 | Melville | G01B 11/27 33/286 |
| 6,124,935 | A | * | 9/2000 | Matthews | G01C 15/008 33/286 |
| 6,230,416 | B1 | * | 5/2001 | Trigilio | B43L 7/027 33/451 |
| 6,453,568 | B1 | * | 9/2002 | Hymer | G01C 15/008 33/276 |
| 6,941,665 | B1 | * | 9/2005 | Budrow | G01C 15/008 33/286 |
| 9,874,438 | B2 | * | 1/2018 | Graddy | G01C 1/00 |
| 10,918,025 | B2 | * | 2/2021 | Jaeger | A01G 23/00 |

(Continued)

FOREIGN PATENT DOCUMENTS

| | | | | | |
|---|---|---|---|---|---|
| DE | 10315939 B3 | * | 8/2004 | ........... | A01G 23/099 |
| EP | 1757184 A1 | * | 2/2007 | ........... | A01G 23/099 |

(Continued)

*Primary Examiner* — Christopher W Fulton
(74) *Attorney, Agent, or Firm* — Fiala & Weaver P.L.L.C.

(57) ABSTRACT

Embodiments described herein are directed to an apparatus for determining a direction in which a tree will fall and a method for using the apparatus. The apparatus may comprise a plate including a substantially straight edge suitable for alignment with a vertex formed by a top cut and a bottom cut of a notch cut into a tree and a substantially level bottom surface suitable for stable placement upon the bottom cut of the notch. In some embodiments, the plate may define an internal cavity sized to accommodate a laser light generator. In other embodiments, a rotatable housing including a cavity sized to accommodate a laser light generator may be adjoined to the plate. Embodiments may permit a laser light generator contained within the cavity or the housing to emanate a beam of laser light in a direction that is substantially perpendicular to the substantially straight edge of the plate.

19 Claims, 8 Drawing Sheets

(56) References Cited

U.S. PATENT DOCUMENTS

| | | | | |
|---|---|---|---|---|
| 2001/0029675 | A1* | 10/2001 | Webb | G01C 15/00 |
| | | | | 33/286 |
| 2002/0092186 | A1* | 7/2002 | Napier | G02B 6/423 |
| | | | | 33/286 |
| 2006/0213069 | A1* | 9/2006 | Martin | G01C 15/008 |
| | | | | 33/286 |
| 2006/0256007 | A1* | 11/2006 | Rosenberg | G01C 21/20 |
| | | | | 342/357.4 |
| 2014/0115907 | A1* | 5/2014 | Gamon | G01C 15/004 |
| | | | | 33/286 |
| 2014/0223750 | A1* | 8/2014 | Diefenderfer | G01B 11/272 |
| | | | | 33/286 |

FOREIGN PATENT DOCUMENTS

| | | | |
|---|---|---|---|
| JP | 3088251 U | * | 9/2002 |
| JP | 2020065471 A | * | 4/2020 |

\* cited by examiner

APPARATUS AND METHOD FOR DETERMINING TREE FALL DIRECTION

BACKGROUND

Tree felling is a long-practiced tree removal process that entails making specific cuts in a tree trunk using manual or motor-manual tools, such as a handsaw or a chainsaw. This tree removal procedure has been widely adopted by tree fellers and sawyers around the globe and includes an arsenal of well-established safety provisions and cutting techniques. For example, directional tree felling is a multi-step process that first involves cutting a notch into a tree trunk in the direction the tree feller wants the tree to fall. Next, the tree feller will make a felling cut into the opposite side of the tree trunk, producing a residual wood strip between the two cuts. The uncut portion of the tree trunk acts as a hinge connecting the tree to its would-be stump. This hinge helps guide the tree's descent in the direction dictated by the notch.

However, incorrect or poor felling techniques can cause a tree to fall in an unpredicted or unintended direction. As an example, a tree feller may simply "eyeball" or "guestimate" where to make the critical cuts in the tree base or not have the requisite amount of experience to properly execute these cuts. Improperly executed cuts can cause the tree to fall in the direction of homes, buildings, or other structures. Other trees could be brought down if in the pathway of a falling tree, along with power lines, traffic lights, street signs, and other obstructions that can quickly create unsafe conditions. Potential property damage due to haphazard tree felling preparation and execution is only one concern, as severe bodily injury and even death become a real risk during the tree felling process. A tree feller him or herself is at risk, along with bystanders in the surrounding area.

For example, consider confined urban areas, where buildings and residences are very closely constructed to one another. There is an alarmingly small margin for error regarding tree felling in these densely populated or heavily constructed areas, as an erroneous directional prediction could mean thousands of pounds of wood plummeting multiple stories to the ground with citizens trapped below. Whether a tree feller is performing tree removal in a residential or commercial environment, safety becomes a foremost priority—a priority underscored by proper application of notch cuts.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments described herein are directed to an apparatus for determining a direction in which a tree will fall and a method for using the apparatus. The apparatus may comprise a plate including a substantially straight edge suitable for alignment with a vertex formed by a top cut and a bottom cut of a notch cut into a tree and a substantially level bottom surface suitable for stable placement upon the bottom cut of the notch. In some embodiments, the plate may define an internal cavity sized to accommodate a laser light generator. In other embodiments, a rotatable housing including a cavity sized to accommodate a laser light generator may be adjoined to the plate. Embodiments may permit a laser light generator contained within the cavity or the housing to emanate a beam of laser light in a direction that is substantially perpendicular to the substantially straight edge of the plate.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments and, together with the description, further serve to explain the principles of the embodiments and to enable a person skilled in the pertinent art to make and use the embodiments.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification and accompanying drawings disclose one or more embodiments that incorporate the features of the present invention. The scope of the present invention is not limited to the disclosed embodiments. The disclosed embodiments merely exemplify the present invention, and modified versions of the disclosed embodiments are also encompassed by the present invention. Embodiments of the present invention are defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the discussion, unless otherwise stated, adjectives such as "substantially," "approximately," and "about" modifying a condition or relationship characteristic of a feature or features of an embodiment of the disclosure, are understood to mean that the condition or characteristic is defined to be within tolerances that are acceptable for operation of the embodiment for an application for which it is intended.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures described herein can be spatially arranged in any orientation or manner.

Still further, it should be noted that the drawings/figures are not drawn to scale unless otherwise noted herein.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. An Apparatus for Determining a Direction in which a Tree Will Fall when being Felled Tree felling is a long-practiced tree removal process that entails making specific cuts in a tree trunk using manual or motor-manual tools, such as a handsaw or a chainsaw. This tree removal procedure has been widely adopted by tree fellers and sawyers around the globe and includes an arsenal of well-established safety provisions and cutting techniques. For example, directional tree felling is a multi-step process that first involves cutting a notch into a tree trunk in the direction the tree feller wants the tree to fall. Next, the tree feller will make a felling cut into the opposite side of the tree trunk, producing a residual wood strip between the two cuts. The uncut portion of the tree trunk acts as a hinge connecting the tree to its would-be stump. This hinge helps guide the tree's descent in the direction dictated by the notch.

However, incorrect or poor felling techniques can cause a tree to fall in an unpredicted or unintended direction. As an example, a tree feller may simply "eyeball" or "guestimate" where to make the critical cuts in the tree base or not have the requisite amount of experience to properly execute these cuts. Improperly executed cuts can cause the tree to fall in the direction of homes, buildings, or other structures. Other trees could be brought down if in the pathway of a falling tree, along with power lines, traffic lights, street signs, and other obstructions that can quickly create unsafe conditions. Potential property damage due to haphazard tree felling preparation and execution is only one concern, as severe bodily injury and even death become a real risk during the tree felling process. A tree feller him or herself is at risk, along with bystanders in the surrounding area.

For example, consider confined urban areas, where buildings and residences are very closely constructed to one another. There is an alarmingly small margin for error regarding tree felling in these densely populated or heavily constructed areas, as an erroneous directional prediction could mean thousands of pounds of wood plummeting multiple stories to the ground with citizens trapped below. Whether a tree feller is performing tree removal in a residential or commercial environment, safety becomes a foremost priority—a priority underscored by proper application of notch cuts.

An apparatus for determining a direction a tree will fall when being felled described herein addresses the safety concerns discussed above. For example, the apparatus helps to properly predict a tree felling direction and gives a tree feller an opportunity to correct notch cuts should the direction be off. The apparatus can ensure safety and accuracy and is easy to incorporate into the tree felling process.

Figure 1:
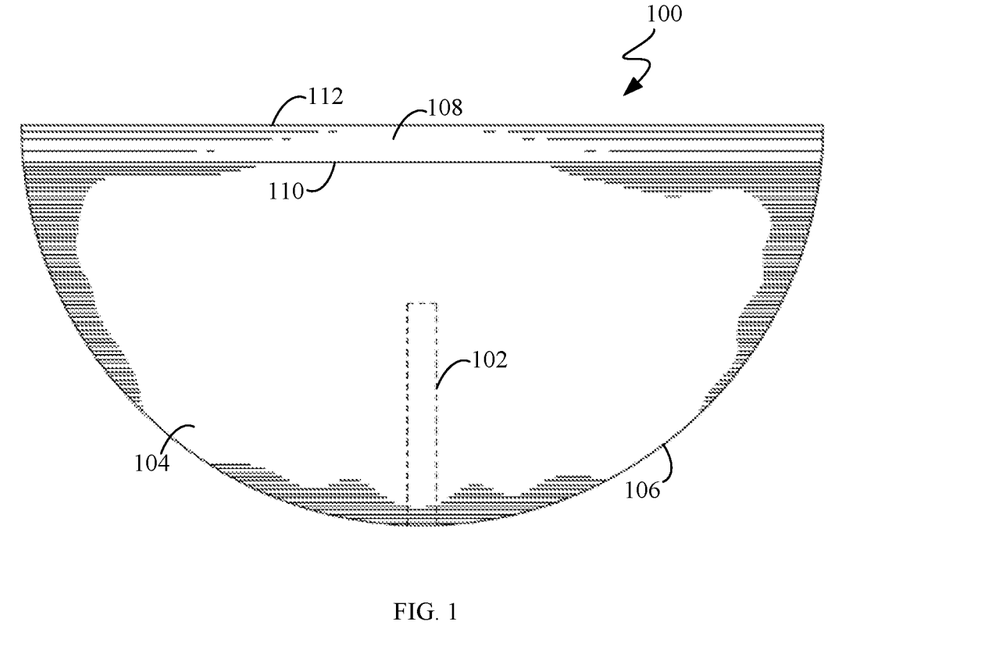
FIG. 1 illustrates a top-down perspective view of an apparatus for determining a direction a tree will fall when being felled, the apparatus including an internal cavity configured to accommodate a laser light generator, in accordance with an embodiment.
Figure 2:
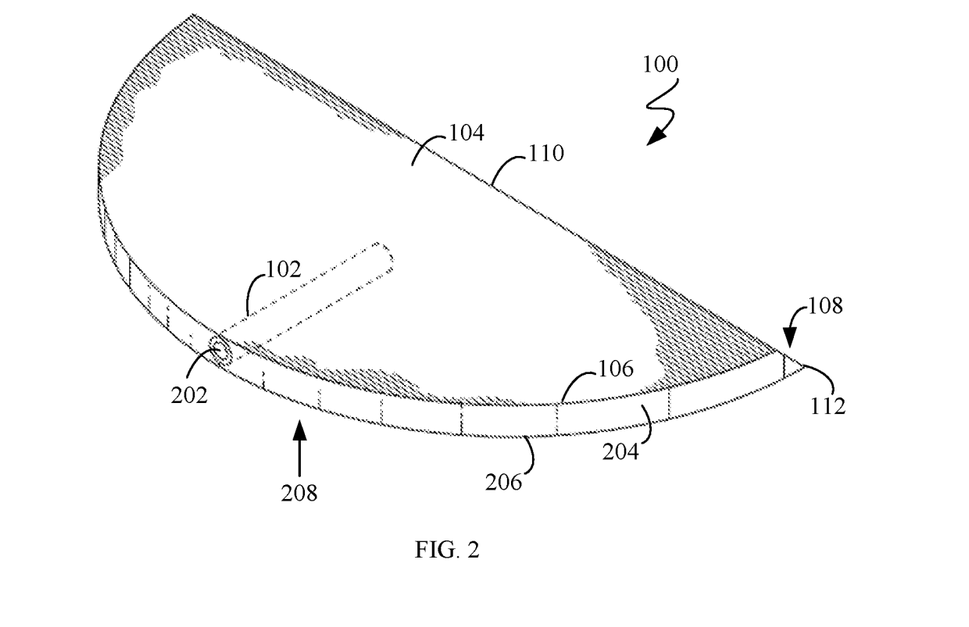
FIG. 2 provides a top-side perspective view the apparatus for determining a direction a tree will fall when being felled depicted in FIG. 1, in accordance with an embodiment.

FIGS. 1 and 2 illustrate different perspective views of an embodiment of the apparatus for determining a direction in which a tree will fall when being felled. In particular, this embodiment, visually represented by an apparatus 100 in FIGS. 1 and 2, assumes a semicircular-shaped, planar or plate-like structure (i.e., a structure that is substantially longer and wider than thick) and includes an internal cavity configured to accommodate a laser light generator.

FIG. 1 illustrates a top-down perspective view of apparatus 100. As shown in FIG. 1, a top surface 104 of apparatus 100 is semicircular in shape and formed by a straight edge 110 that is opposite and adjacent to an arced edge 106. Top surface 104 adjoins a back lateral surface 108 of apparatus 100 at straight edge 110. Straight edge 110 is parallel to a straight edge 112 which serves as a bottom border of back lateral surface 108 and is also substantially straight. Also shown in FIG. 1, straight edge 112 extends more outwardly than straight edge 110 making lateral surface 108 beveled or slanted. In other embodiments, apparatus 100 may assume any shape with at least one substantially straight side, such as: a triangle, a square, a rectangle, a pentagon, a hexagon, an octagon, a decagon, a semi-hexagon, a semi-octagon, and a semi-decagon.

As further shown in FIG. 1, apparatus 100 includes a cavity 102 which is cylindrically shaped and situated in an internal portion of apparatus 100 such that an axis of cylindrical cavity 102 aligns with a center of straight edge 110, a center of straight edge 112, and a center of arced edge 106. In FIG. 1, cavity 102 is shown to be completely integrated into the internal portion of apparatus 100 such that top surface 104 is substantially level (i.e., having minimal height differences between any given points on a surface). In other embodiments, cavity 102 may assume other shapes (e.g., rectangular) and placements within and/ or on top of apparatus 100. For example, cavity 102 may be situated only partially in the internal portion of apparatus 100 causing a top portion of cavity 102 to extend above top surface 104 or an entirety of cavity 102 may extend above top surface 104.

Cavity 102 may be sized and shaped to hold a laser light generator and positioned within apparatus 100 to maintain the laser light generator pointing in a direction perpendicular to straight edge 110 and straight edge 112. For example, in FIG. 1, cavity 102 may house a laser pointer generator enclosed within a cylindrical casing or components making up a laser light generator (e.g., a laser diode, a power source). Cavity 102 may also be sized and shaped to accommodate varying sizes and different shapes of laser light generators.

To help further illustrate the various features of apparatus 100, FIG. 2 will now be described. FIG. 2 provides a top-side perspective view of apparatus 100. From this perspective, a front lateral side 204 (not pictured in FIG. 1) is exposed. Front lateral side 204 adjoins top surface 104 at arced edge 106 and adjoins a bottom surface 208 at an arced edge 206. Front lateral side 204 is perpendicular to top surface 104 and bottom surface 208. Arced edge 206 aligns parallelly to arced edge 106.

In FIG. 2, back lateral side 108, which is opposite front lateral side 204, is beveled. Back lateral side 108 adjoins top surface 104 at straight edge 110, forming an angle between the surfaces that is greater than ninety degrees. Back lateral side 108 adjoins bottom surface 208 at straight edge 112, forming an angle between the surfaces that is less than ninety degrees. As such, in the embodiment depicted in FIGS. 1 and 2, back lateral side 108 is not perpendicular to top surface 104 or bottom surface 208. In other embodiments, back lateral side 108 may be beveled such that an angle between back lateral side 108 and top surface 104 is less than ninety degrees and an angle between back lateral side 108 and bottom surface 208 is greater than ninety degrees. Yet in other embodiments, back lateral side 108 may not be beveled so that any angle between two adjoining sides is ninety degrees.

As further shown in FIG. 2, cavity 102 includes an open end 202 that exposes an interior of cavity 102 though front lateral surface 204. Open end 202 may be sized to allow a laser light generator to be placed into cavity 102 by sliding the laser light generator into cavity 102 through open end 202. In other embodiments, the open end 202 may be sized so that a laser light generator is permanently housed in cavity 102 and not removable by a user of apparatus 100. Open end 202 may also permit a beam of laser light generated by the laser light generator housed within cavity 102 to emanate outside the interior of cavity 102 through open end 202 in a direction that is perpendicular to straight edge 110 and straight edge 112. In other embodiments, the beam of laser light from the laser light generator may emanate in a direction perpendicular only to one edge of back lateral side 108. Cavity 102 is depicted in FIG. 2 to be completely integrated into the internal portion of apparatus 100 such that top surface 104 and bottom surface 208 are substantially flat and level.

Figure 3:
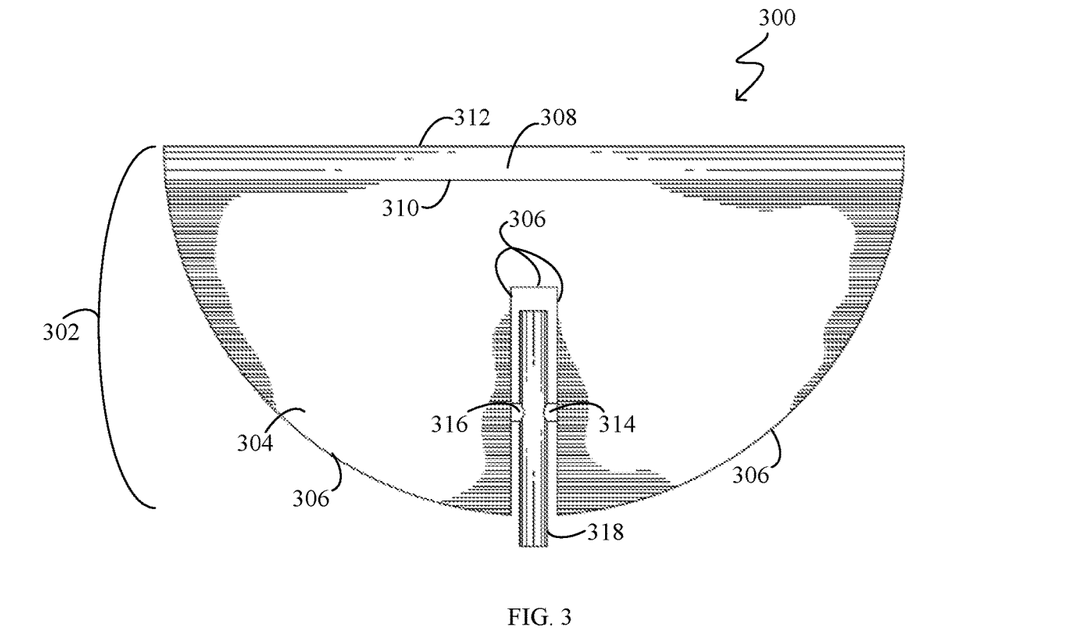
FIG. 3 illustrates a top-down perspective view of an apparatus for determining a direction a tree will fall when being felled, the apparatus including a rotatable housing configured to accommodate a laser light generator, in accordance with an embodiment.
Figure 4:
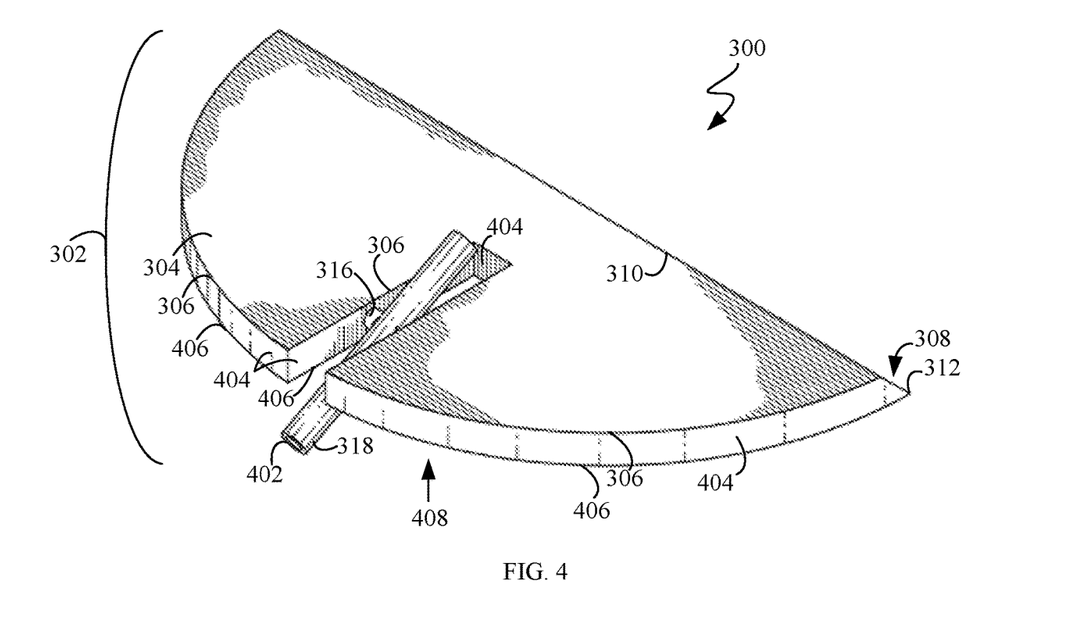
FIG. 4 provides a top-side perspective view of the apparatus for determining a direction a tree will fall when being felled depicted in FIG. 3, in accordance with an example embodiment.
Figure 5:
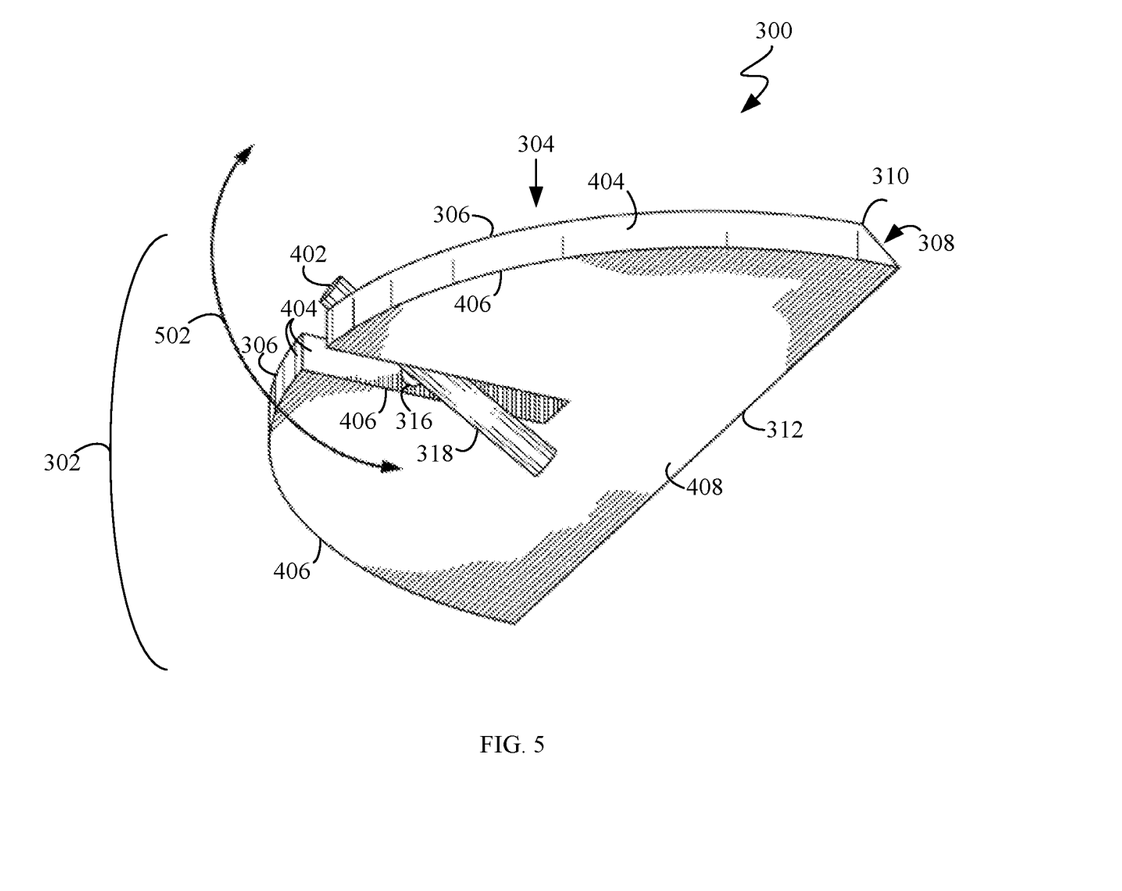
FIG. 5 provides a bottom-side perspective view of the apparatus for determining a direction a tree will fall when being felled depicted in FIGS. 3 and 4, in accordance with an embodiment.

FIGS. 3-5 illustrate different perspective views of another embodiment of the apparatus for determining a direction in which a tree will fall when being felled. In particular, this embodiment, visually represented by an apparatus 300 in FIGS. 3-5, includes a semicircular-shaped plate 302 and a rotatable housing 318 for a laser light generator which is adjoined to plate 302. In other embodiments, plate 302 may assume any shape with at least one substantially straight side, such as: a triangle, a square, a rectangle, a pentagon, a hexagon, an octagon, a decagon, a semi-hexagon, a semi-octagon, and a semi-decagon.

FIG. 3 illustrates a top-down perspective view of apparatus 300. As shown in FIG. 3, a top surface 304 of plate 302 is semicircular in shape and formed by a straight edge 310 that is opposite and adjacent to a partially arced edge 306 that outlines a rounded side of top surface 304 and a rectangular notch formed in plate 302. Top surface 304 adjoins a back lateral surface 308 of plate 302 at straight edge 310. Straight edge 310 is parallel to a straight edge 312 which is a bottom edge of back lateral surface 308. Also shown in FIG. 3, second straight edge 312 extends more outwardly than first straight edge 310 making lateral surface 308 beveled or slanted.

As further shown in FIG. 3, housing 318, which is cylindrically shaped, is adjoined to plate 302 via a first peg 314 and a second peg 316 connected on opposing sides of housing 318 and pivotably rotatable about an axis defined by first peg 314 and second peg 316. For example, as demonstrated in FIG. 3, housing 318 may be rotated to a position such that housing 318 is perpendicular to straight edge 310 and straight edge 312. In FIG. 3, housing 318 is situated within the rectangular notch cut into top surface 304 such that an axis of cylindrical shaped housing 318 aligns with a center of straight edge 310, a center of straight edge 312, and a center of partially arced edge 306.

Moreover, housing 318 may include a cavity that is sized and shaped to hold a laser light generator. For example, the cavity of 318 may house a laser pointer generator enclosed within a cylindrical casing or components making up a laser light generator (e.g., an energy source (also known as a pump), a laser (or gain) medium, and an optical resonator). The cavity of housing 318 may be sized to accommodate varying sizes of laser light generators and different shapes of laser light generators. In other embodiments, housing 318 and the cavity of housing 318 may assume other shapes and be shaped differently from each. As an example, housing 318 could be rectangular, while the cavity of housing 318 has a cylindrical shape.

To help further illustrate the various features of apparatus 300, FIG. 4 will now be described. FIG. 4 provides a top-side perspective view of apparatus 300. From this perspective, a front lateral side 404 (not pictured in FIG. 3) is exposed. Front lateral side 404 vertically defines the rounded side of plate 302 that is bisected by a set of three straight sides delineating the rectangular notch cut into plate 302. Front lateral side 404 adjoins top surface 304 at partially arced edge 306 and adjoins a bottom surface 408 at a partially arced edge 406, which aligns parallelly to partially arced edge 306 and outlines the rounded side of top surface 304 and the rectangular notch cut into plate 302. Front lateral side 404 is also perpendicular to top surface 304 and bottom surface 408.

As shown in FIG. 4, back lateral side 308, which is opposite front lateral side 404, is beveled. Back lateral side 308 adjoins top surface 304 at straight edge 310, forming an angle between these surfaces that is greater than ninety degrees. Back lateral side 308 adjoins bottom surface 408 at straight edge 312 (of which an unhindered perspective of is provided in FIG. 3), forming an angle between these surfaces that is less than ninety degrees. As such, in the embodiment depicted in FIGS. 3-5, back lateral side 308 is not perpendicular to top surface 304 or bottom surface 408. In other embodiments, back lateral side 308 may be beveled such that an angle between back lateral side 308 and top surface 304 is less than ninety degrees and an angle between back lateral side 308 and bottom surface 408 is greater than ninety degrees. Still yet in other embodiments, back lateral side 108 may not be beveled such that any angle between two adjoining sides is ninety degrees.

As further shown in FIG. 4, housing 318 includes an aperture 402 that exposes the cavity of housing 318. Aperture 402 may be sized to allow a laser light generator to be placed into the cavity of housing 318 by sliding the laser light generator into the cavity through aperture 402. In other embodiments, aperture 402 may be sized so that a laser light generator is permanently housed within the internal cavity of housing 318 and not removable by a user of apparatus 300. Aperture 402 may also permit a beam of laser light generated by the laser light generator housed within the cavity of housing 318 to emanate outside the cavity through aperture 402.

As described previously with reference to FIG. 3, housing 318 is adjoined to plate 302 via first peg 314 (not pictured in FIG. 4) and second peg 316. For example, first peg 314 is affixed to a side of housing 318 and to a portion of front lateral side 404 that vertically defines the rectangular notch cut into plate 302. Second peg 316 is affixed to an opposing side of housing 318 and to an opposing side the portion of front lateral side 404 that vertically defines the rectangular notch cut into plate 302. In other embodiments, housing 318 may be adjoined to plate 302 via a single peg connected to the base and/or top of housing 318 or that extends through the middle of housing 318, where each end of the single peg is affixed to opposing sides of the portion of front lateral side 404 that vertically defines the rectangular notch cut into plate 302. Still yet in other embodiments, housing 318 may be adjoined by a mechanism connecting to one or more surfaces of plate 302, such as top surface 304, front lateral surface 404, or bottom surface 408. In any of these embodiments, a snapping or hooking feature, or a ball and socket technique may be used adjoin housing 318 to plate 302 via a peg or other mechanism. In accordance with embodiments, first peg 314 and/or second peg 316 may comprise an integral part of plate 302 and fit into housing 318 using "male" and "female" connectors or another suitable fastener. Alternatively, first peg 314 and/or second peg 316 may comprise an integral part of housing 318 and fit into plate 302 using "male" and "female" connectors or another suitable fastener.

As previously described with reference to FIG. 3, housing 318 is pivotably rotatable about an axis defined by first peg 314 and second peg 316. For example, as depicted in FIG. 4, housing 318 is vertically rotated downward causing a front of housing 318 to extend down through the rectangular notch below bottom surface 408. By vertically rotating housing 318 downward, a laser pointer generator within housing 318 is permitted to point in directions below a horizontal and reflect a beam of laser light from the laser light generator onto surfaces located below apparatus 300.

To provide further explanation for particular features of apparatus 300, FIG. 5 providing a bottom-side perspective view of apparatus 300 will now be referenced. In FIG. 5, housing 318 is depicted to be vertically rotated upward causing the front of housing 318 to extend up through the rectangular notch above top surface 304. By vertically rotating housing 318 upward, a laser pointer generator within housing 318 is permitted to point in directions above a horizontal and reflect a beam of laser light from the laser light generator onto surfaces located above apparatus 300.

As indicated by a line 502, housing 318 may rotate in a clockwise or a counter-clockwise direction. Housing 318 may also be capable of completing a full revolution (i.e., turning three-hundred and sixty degrees) when being pivotably rotated, allowing a beam of laser light from a laser light generator within housing 318 to emanate in any direction in which housing 318 is pointed within a plane that perpendicularly bisects straight edge 310 and straight edge 312.

Housing 318 may have a diameter similar to or smaller than a height of front lateral surface 404 so that when housing 318 is rotated to point in a direction perpendicular to straight edge 310 and straight edge 312, top surface 304 and bottom surface 408 are substantially flat and level, allowing for apparatus 300 to be easily stored with other tree felling equipment and transported to tree removal sites.

Furthermore, in some embodiments, a laser light generator within housing 318 may be turned on with a remote control or housing 318 may include an on/off switch or button situated on an exterior of housing 318 for powering on and off the laser light generator. In other embodiments, housing 318 may have an opening on the exterior of housing 318 that exposes an on/off switch or button on a casing of a laser light generator within housing 318. Furthermore, the power source (e.g., batteries) for a laser light generator may be removed and replaced from an opening opposite aperture 402 in the back of housing 318 or via some other suitable access point. In embodiments, housing 318 may include a power socket for recharging the power source of the laser light generator.

In embodiments, apparatus 300 may belong to a set of differently sized plates to support use with differently sized trees. When storing, the flat and level feature of the set of differently sized plates promotes stacking the plates on each other and with other equipment having flat sides such as a tool box. In accordance with one such embodiment, a single laser light generator may be used interchangeably with each plate in the set of differently sized plates. For instance, the laser light generator may be removed from a first plate and inserted into a second plate that is relatively larger than the first plate when the apparatus is used to fell a larger tree.

Additionally, the flat, level nature of apparatus 300 allows for effortless transport to tree removal sites as opposed to more bulky equipment (e.g., chainsaw, ladder) and irregularly shaped equipment (e.g., wedges). To help further with the ease of transporting, apparatus 300 may be fabricated out of lightweight materials such as foams, polymers, rubbers, wood, and metals like aluminum. Pliability of a material may also influence what materials are used to fabricate apparatus 300.

In accordance with embodiments, housing 318 and plate 302 may be made of different materials. For example, housing 318 may be made of a stronger, more durable material than plate 302 to protect the electrical components of the laser light generator within housing 318. Plate 302 may be manufactured as a single component or can be assembled from multiple interconnecting parts (e.g., including first and second peg 314 and 316). Plate 302 may be manufactured from any suitable, lightweight material(s), including plastic (e.g., through injection molding), rubber, metal, foam, composites, or a combination of metals/alloys, etc. Housing 318 may be formed as a single component or by two or more connected or interlocking parts (e.g., including first and second peg 314 and 316). Alternatively, housing 318 may be made from stronger material(s), including plastic (e.g., through injection molding), metals such as titanium, composites such as fibre-reinforced plastic, or a combination of metals/alloys, etc.

In sum, given the myriad of other tools used by a tree feller during the tree removal process, this apparatus should be easily transported, stored, and require minimal time to set up. A clean, flat construction of this apparatus may allow for convenient placement of it in tool boxes, work trucks, and even on a tree feller's person. Lightweight and compact, this apparatus' design may eliminate cumbersome bulk, while proving simple and comfortable during set up and take down.

III. Method for Using an Apparatus for Determining a Direction in which a Tree Will Fall when being Felled FIGS. 6-11 will now be described to illustrate an exemplary manner of using the apparatus for determining a direction in which a tree will fall when being felled. More specifically, what will be described is one exemplary method for using the apparatus with a notch cut into a tree to determine a direction the tree will fall. Apparatus 300 depicted in FIGS. 3-5 will be the embodiment used in the following description on how to use the apparatus. Apparatus 100 depicted in FIGS. 1 and 2 and any embodiments described above may be used similarly to apparatus 300 as described below to the extent that other embodiments possess a similar or same feature set as apparatus 300 that enable such use.

Figure 6:
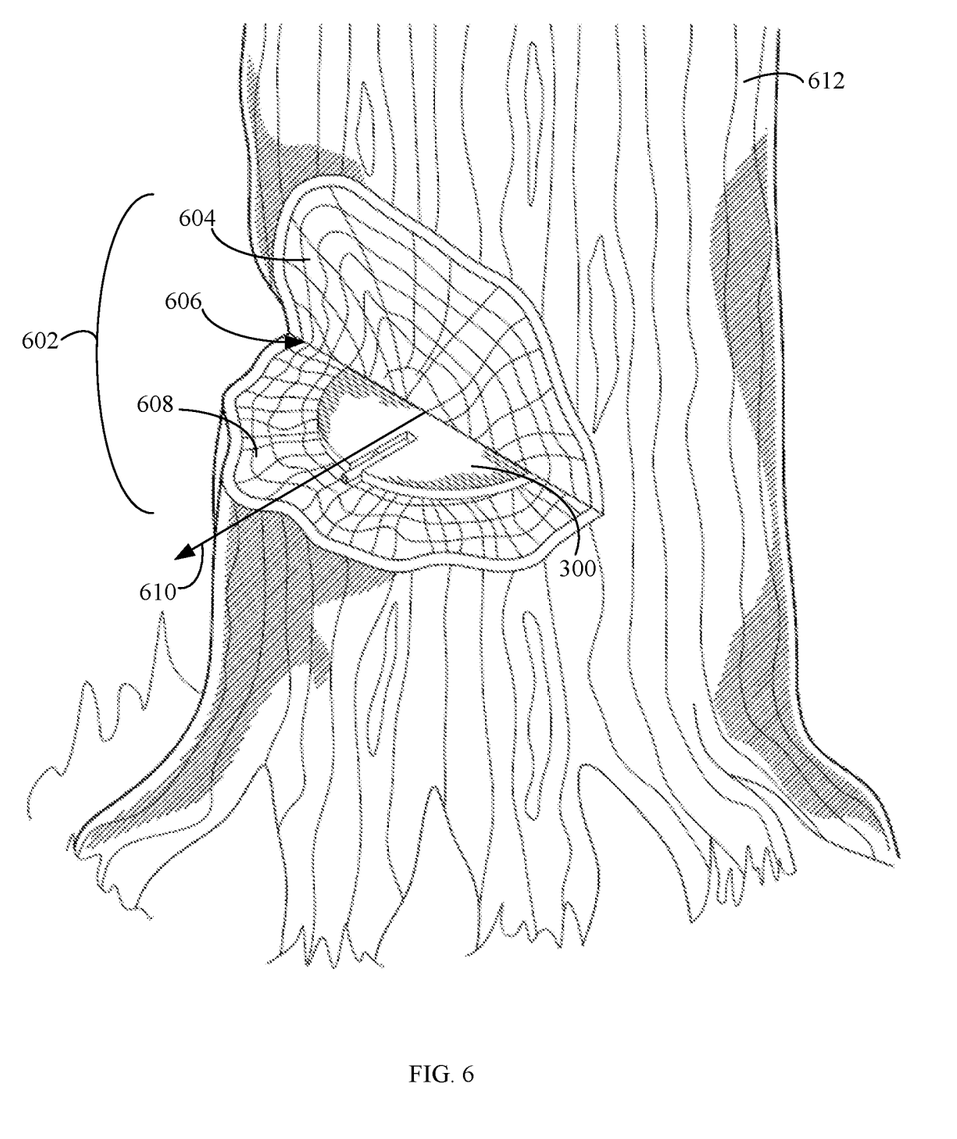
FIG. 6 depicts a tree marked for felling having a notch cut into it and an apparatus for determining a direction in which the tree will fall placed in the notch, in accordance with an embodiment.

FIG. 6 depicts a tree marked for felling having a notch cut into it and an apparatus for determining a direction in which the tree will fall placed in the notch. As shown in FIG. 6, a tree 612 has a notch 602 cut into a base of a trunk of tree 612 and notch 602 includes two intersecting cuts: a top cut 604 and a bottom cut 608 that are adjoined at a vertex 606. Before making these cuts into tree 612, a tree feller may identify a desired direction for tree 612 to fall. The desired direction should be clear of any trees or other obstructions to allow a tree to safely descend to land. A tree falling in an unobstructed direction will prevent the tree from getting logged against other trees and kicking up dangerous debris that could strike the feller.

After the desired direction is identified, notch 602 may be cut into a side of tree 612 that faces the desired direction. For example, top cut 604 may first be cut into tree 612 at an angle consistent with a type of notch the feller is seeking (e.g., for a "conventional" notch a top cut may be cut into a tree at a forty-five-degree angle). Once top cut 604 is completed, the feller may cut bottom cut 608 into tree 612 beginning at a height of tree 612 that will create an angle consistent with the desired notch (e.g., for a conventional notch a bottom cut is made parallel to flat ground). The feller should stop cutting once bottom cut 608 meets top cut 604 forming vertex 606. A direction 610 perpendicular to vertex 606 is indicative of a direction that tree 612 will fall after the final felling steps are performed (e.g., making a felling cut into a side of tree 612 opposite to notch 602).

To ensure tree 612 will not fall in an unintended direction, apparatus 300 may be used to determine if direction 610 perpendicular to vertex 606 is the same as the desired direction before preforming the final felling steps. For example, as seen in FIG. 6, apparatus 300 is placed in notch 602 abutting vertex 606 and resting on bottom cut 608. Once the laser light generator of apparatus 300 is switched on, a beam of laser light emanating from the laser light generator of apparatus 300 will be indicative of an actual direction tree 612 will fall, which is direction 610 perpendicular to vertex 606. If the observed beam of laser light points in the desired direction (i.e., the desired direction is the same as the actual direction), then the notch cuts are properly executed and the feller may continue felling tree 612. Conversely, if the observed beam of laser light does not point in the desired direction, then the feller can modify top cut 604 and bottom cut 608 to correct notch 602.

Apparatus 300 may be used with other notches such as an open-faced notch and a Humboldt notch. For example, because the bottom cuts of these notches are not level with ground, apparatus 300 may be placed and held up against an apex of these notches by a feller or secured to a tree to hold apparatus 300 flush with the apex of these notches.

This process of using apparatus 300 removes the guesswork out of determining if the desired direction of a tree falling is the same as the actual direction the tree will fall. Moreover, this process enables a tree feller to modify cuts of an incorrectly executed notch and avoid the perils that come with a tree falling in an unpredicted or unintended direction.

Figure 7:
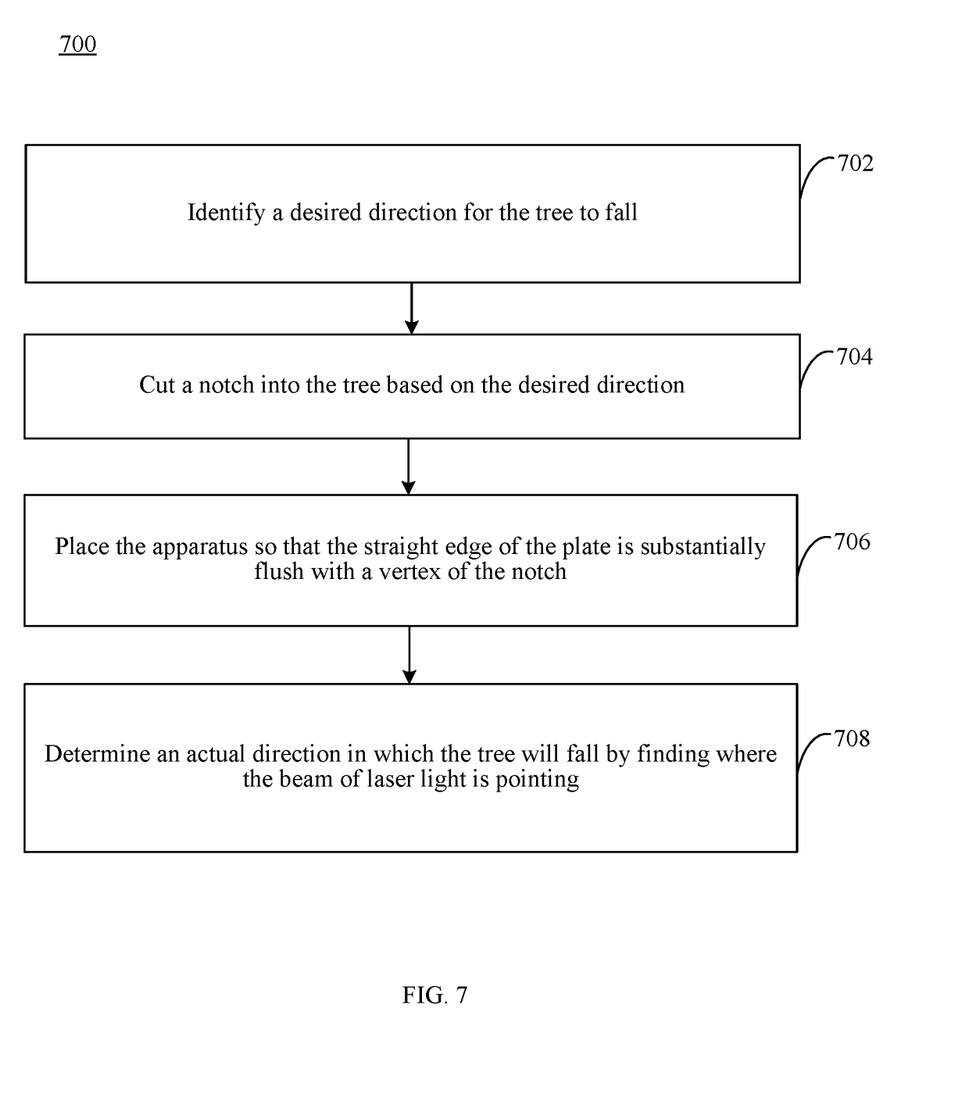
FIG. 7 depicts a flowchart of a method for using an apparatus to determine a direction in which a tree will fall, according to an example embodiment.

To help further illustrate this process, FIG. 7 will now be described. FIG. 7 depicts a flowchart 700 of a method for using an apparatus to determine a direction in which a tree will fall, according to an example embodiment. FIG. 7 will be described with continued reference to FIG. 6. However, other structural and operational embodiments will be apparent to persons skilled in the relevant art(s) based on the following discussion regarding flowchart 700.

As shown in FIG. 7, the method of flowchart 700 begins at step 702. In step 702, a desired direction for the tree to fall is identified. For example, and with continued reference to FIG. 6, a tree feller may identify a desired direction for tree 612 to fall before cutting a notch into tree 612. The feller should look at where tree 612 is located and what objects surround tree 612. Houses, powerlines, fences, and other structures can be damaged by tree 612 when failing. The feller should also note other trees surrounding tree 612. Tree 612 unexpectedly striking another tree during its descent could cause another tree to fall in a direction of surrounding structures and/or bystanders. The feller may also look at tree 612 itself to identify the desired direction for tree 612 to fall. For example, the feller may observe that tree 612 naturally leans in a direction that is free of objects and decide to fell tree 612 in the direction that tree 612 naturally leans.

At step 704 in flowchart 700, a notch is cut into the tree based on the desired direction. For example, as described above and with continued reference to FIG. 6, notch 602 may be cut into a side of tree 612 that faces the desired direction. To illustrate, a feller may start to cut a conventional notch into tree 612 by cutting top cut 604 into tree 612 at a forty-five-degree angle, or some other angle. To finish cutting the conventional notch in tree 612, the feller may cut bottom cut 608 into tree 612 beginning at a height of tree 612 that will allow bottom cut 608 to be parallel to flat ground and to meet top cut 604 at vertex 606.

At step 706 in flowchart 700, the apparatus is placed so that the straight edge of the plate is substantially flush with a vertex of the notch. For example, with continued reference to FIG. 6, a tree feller may place apparatus 300 in notch 602 so that apparatus 300 abuts vertex 606 and rests on bottom cut 608.

At step 708 in flowchart 700, an actual direction in which the tree will fall is determined by finding where the beam of laser light is pointing. For example, with continued reference to FIG. 6, a tree feller may step away from tree 612 in the direction notch 602 faces and reflect the beam of laser light of a surface to find where the beam of laser light points. As described above, a beam of laser light emanating from the laser light generator of apparatus 300 will be indicative of an actual direction tree 612 will fall.

Figure 8:
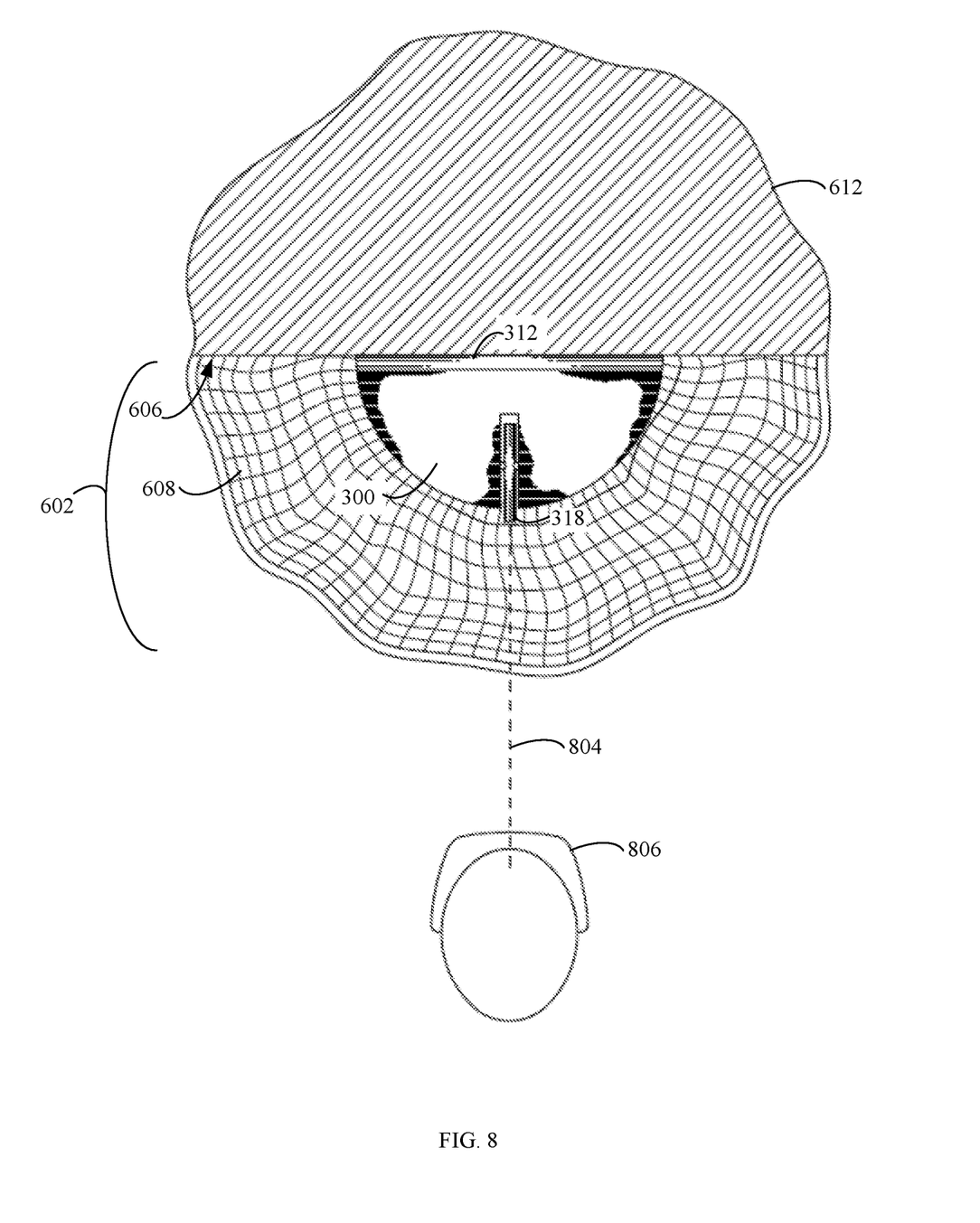
FIG. 8 depicts a top-down perspective view of the tree marked for felling depicted in FIG. 6, in accordance with an embodiment.

To help further illustrate step 708 of flowchart 700, FIGS. 8 and 9 will now be described. FIG. 8 provides a top-down perspective of tree 612 and placement of apparatus 300 in notch 602. As shown in FIG. 8, apparatus 300 is placed in notch 602 so that straight edge 312 of apparatus 300 is substantially flush with vertex 606. Straight edge 312 being substantially straight enables apparatus 300 to be easily aligned with vertex 606.

As further shown in FIG. 8, apparatus 300 is placed in notch 602 so that a center of straight edge 312 is aligned with a center of vertex 606 and a beam of laser light 704 generated by a laser light generator emanates in a direction that perpendicularly bisects vertex 606 and straight edge 312. A feller may determine an actual direction in which tree 612 will fall by finding where beam of laser light 704 is pointing. For example, the feller may move away from tree 612 substantially in a direction in which notch 602 faces and use his or her hard hat 806 (or another surface) to find beam of laser light 804 by reflecting beam of laser light off hard hat 806.

Beam of laser light 804 is indicative of a direction tree 612 will fall and where an exterior portion of tree 612 that is within a same vertical plane as the center of vertex 606 will land after falling. This information may be helpful in determining if different parts of a tree can fall in a direction without contacting other trees or structures in environments where potential fall paths are limited and narrow (e.g., dense forests or confined urban areas). For example, if a distance measured from a tip of a limb to the center of vertex 606 indicates that the limb is outside of an unobstructed path, then the limb can be removed before the tree is coaxed to fall. In embodiments, laser light generators producing any color (e.g., red, red-orange, yellow, blue, green) of a beam of laser light can be used in implementing the apparatus. However, using a laser light generator that produces a green beam of laser light may be more beneficial to use because a green beam of laser light is more visible to a human eye. Higher visibility of a beam of laser light may be more helpful to a feller when removing a tree in bright conditions.

Straight edge 312 being substantially long provides convenient visual markers for the tree feller to center a laser light generator within a notch without taking measurements. Instead of a thin or small reference point being used in the notch, a long edge that stretches along the bottom cut of the notch will enable the tree feller to better spot when, say, a laser pointer is, in fact, off-center.

Figure 9:
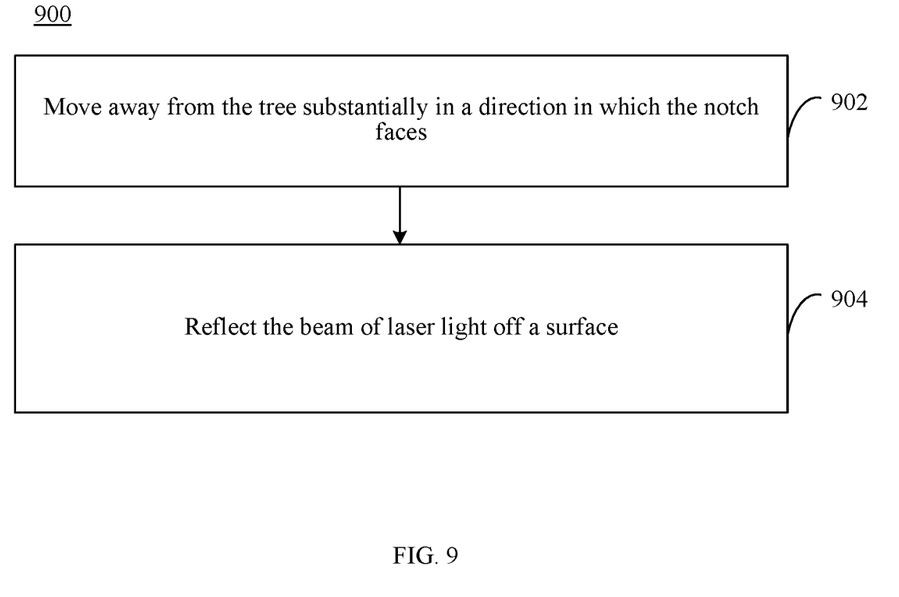
FIG. 9 depicts a flowchart of a method for determining an actual direction in which a tree will fall by finding where a beam of a laser light is pointing, according to an example embodiment.
Figure 10:
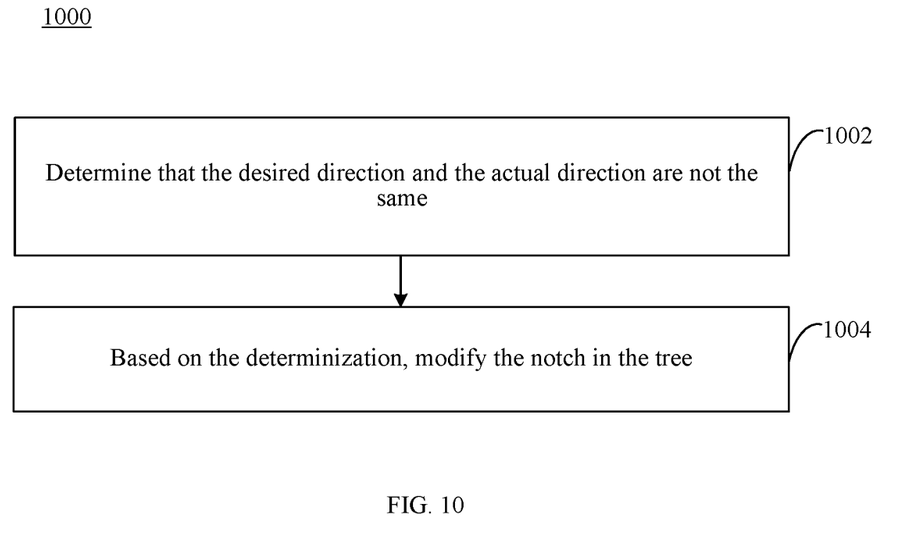
FIG. 10 depicts a flowchart of a method for determining that a desired direction and an actual direction are not the same, according to an example embodiment.

FIG. 9 depicts a flowchart 900 of a method for determining where the actual direction in which the tree will fall by finding where the beam of a laser light is pointing, according to an example embodiment. FIG. 10 will be described with continued reference to FIGS. 6 and 8. However, other structural and operational embodiments will be apparent to persons skilled in the relevant art(s) based on the following discussion regarding flowchart 900.

As shown in FIG. 9, the method of flowchart 900 begins at step 902. In step 902, the tree is moved away from substantially in a direction in which the notch faces. For example, and with continued reference to FIGS. 6 and 8, the feller may move some feet away from tree 612 walking in a direction in which notch 602 faces.

At step 904 in flowchart 900, the beam of laser light is reflected off a surface. For example, as described above and with continued reference to FIGS. 6 and 8, a tree feller may turn around and face tree 612 and use his or her hard hat 806 (or another surface) to find beam of laser light 804 by reflecting beam of laser light off hard hat 806. If observed beam of laser light 804 points in the desired direction (i.e., the desired direction is the same as the actual direction), then the notch cuts are properly executed and the feller may continue felling tree 612.

In contrast, FIG. 10 depicts a flowchart 1000 of a method for determining that the desired direction and the actual direction are not the same, according to an example embodiment. FIG. 10 will be described with continued reference to FIGS. 6 and 8. However, other structural and operational embodiments will be apparent to persons skilled in the relevant art(s) based on the following discussion regarding flowchart 1000.

As shown in FIG. 10, the method of flowchart 1000 begins at step 1002. In step 1002, it is determined that the desired direction and the actual direction are not the same. For example, and with continued reference to FIGS. 6 and 8, after reflecting beam of laser light 804 off hardhat 06, the feller may observe that the beam of laser light 804 does not point in the desired direction.

At step 1004 in flowchart 1000, based on the determinization, the notch in the tree is modified. For example, with continued reference to FIGS. 6 and 8, after determining that the desired direction and the actual direction are not the same, the feller can modify top cut 604 and bottom cut 608 to correct notch 602. For example, portions of the trunk of tree 612 around notch 602 may further be removed to correct top cut 604 and bottom cut 608.

Figure 11:
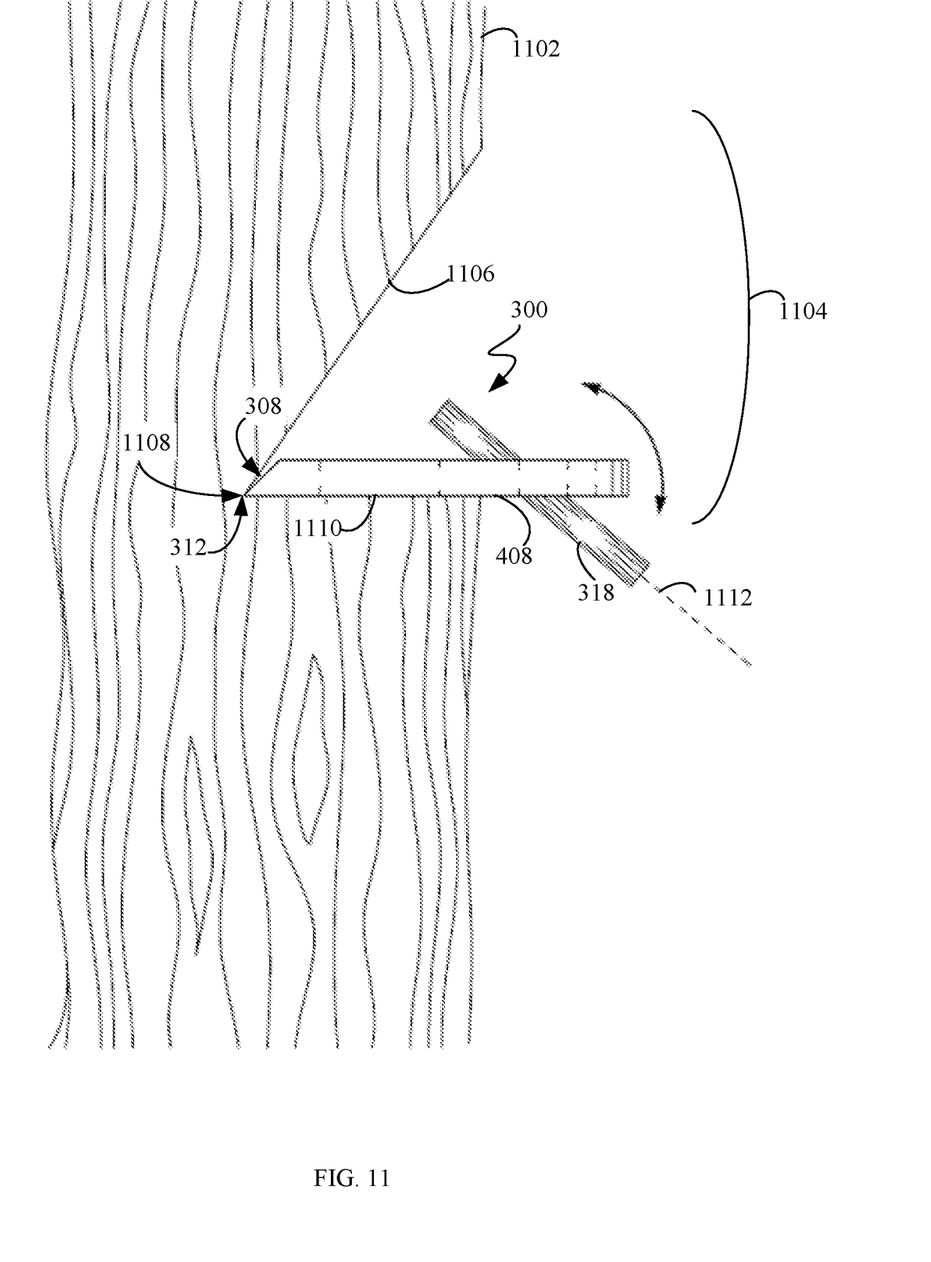
FIG. 11 depicts a notch cut into a tree at a height high above ground level and an apparatus for determining where a tree will fall placed in the notch, in accordance with an embodiment.

Apparatus 300 can also be used when cutting a tall tree needing to be removed in sections. To help illustrate this, FIG. 11 will now be described. FIG. 11 depicts a notch cut into a tree at a height above ground level requiring a feller to climb up the tree and place the apparatus for determining where a tree will fall in the notch.

As shown in FIG. 11, a tree 1102 has a notch 1104 cut into a trunk of tree 1102 and notch 1104 includes two intersecting cuts: a top cut 1106 and a bottom cut 1110 that meet at a vertex 1108. As further shown in FIG. 11, apparatus 300 is placed in notch 1104 such that straight edge 312 of apparatus 300 is substantially flush with vertex 1108 and partially hangs outside of notch 1104. In accordance with embodiments, apparatus 300 may include a mechanism for securing apparatus 300 to tree 1102 if apparatus 300 is substantially larger than notch 1104 and may fall out from notch 1104.

To determine what direction a portion of tree 1102 above bottom cut 1110 will fall, the feller who has climbed up tree 1102 may rotate housing 318 vertically down to point at the ground. A beam of laser light 1112 indicates a direction the portion of tree 1102 above bottom cut 1110 will fall. The feller may then climb down to ground level to find or have an assistant find where beam of laser light 1112 is pointing by reflecting beam of laser light 1112 off a surface. If beam of laser light 1112 points in a direction the feller desires the portion of tree 1102 to fall, then the feller may continue felling tree 1102. Conversely, if beam of laser light 1112 points in an unwanted direction, then the feller will need to modify notch 1104.

As described previously, back lateral surface 308 is beveled and bottom surface 408 is substantially level and flat. These features allow for apparatus 300 to better fit into notch 1104 as apparatus 300 is designed to match the shape of notch 1104. For example, the bevel of back lateral surface 308 allows a feller to easily align straight edge 312 with vertex 1108 by simply placing straight edge 312 flush against vertex 1108. If back lateral surface 308 was not beveled, then straight edge 312 would not be able to be placed directly against vertex 1108, making it harder for a feller to properly align straight edge 312 with vertex 1108. Aligning straight edge 312 with vertex 1108 is integral to correctly determining the direction a tree will fall. Furthermore, the planar or plate-like structure of apparatus 300 further helps the feller to correctly align straight edge 312 with vertex 1108 by allowing for stable placement of apparatus 300 upon bottom cut 1110 of notch 1104.

VI. Conclusion

While various embodiments have been described above, it should be understood that they have been presented by way of example only, and not limitation. It will be apparent to persons skilled in the relevant art that various changes in form and detail can be made therein without departing from the spirit and scope of the embodiments. Thus, the breadth and scope of the embodiments should not be limited by any of the above-described exemplary embodiments, but should be defined only in accordance with the following claims and their equivalents.

What is claimed is:

1. An apparatus for determining a direction in which a tree will fall, comprising:
    a plate comprising a top surface, a substantially level bottom surface opposite to the top surface and suitable for stable placement upon a bottom cut of a notch in the tree, a first lateral surface situated between and adjoining the top surface and the bottom surface, and a second lateral surface situated between and adjoining the top surface and the bottom surface and opposite to the first lateral surface, an edge at which the second lateral surface adjoins the bottom surface defining a substantially straight line and being suitable for alignment with a vertex formed by a top cut and the bottom cut of the notch, the second lateral surface being beveled such that an angle between the second lateral surface and the bottom surface is less than ninety degrees thereby enabling the edge to be placed substantially flush against the vertex; and
    the plate defining an internal cavity having an open end in the first lateral surface, the internal cavity being sized to accommodate a laser light generator, and the open end of the internal cavity being suitable to permit a beam of laser light generated by the laser light generator to emanate outside the internal cavity when the laser light generator is housed therein, the emanation being in a direction that is substantially perpendicular to the substantially straight line of the edge that adjoins the second lateral surface to the bottom surface.

2. The apparatus of claim 1, wherein the top surface of the plate is substantially level.

3. The apparatus of claim 1, wherein the top surface and the bottom surface are substantially semicircular in shape and the first lateral side is curved.

4. The apparatus of claim 1, wherein the top surface and the bottom surface are both substantially shaped as:
    a triangle, a square, a rectangle, a hexagon, an octagon, a decagon, a semi-hexagon, a semi-octagon, or a semi-decagon.

5. The apparatus of claim 1, further comprising the laser light generator.

6. The apparatus of claim 5, wherein the laser light generator generates a green beam of laser light.

7. An apparatus for determining a direction in which a tree will fall, comprising:
    a plate comprising a top surface, a substantially level bottom surface opposite to the top surface and suitable for stable placement upon a bottom cut of a notch in the tree, a first lateral surface situated between and adjoining the top surface and the bottom surface, and a second lateral surface situated between and adjoining the top surface and the bottom surface and opposite to the first lateral surface, an edge at which the second lateral surface adjoins the bottom surface defining a substantially straight line and being suitable for alignment with a vertex formed by a top cut and the bottom cut of the notch; and
    a housing that is adjoined to one or more of the top surface and the second lateral surface, the housing defining an internal cavity and an aperture, the cavity being sized to accommodate a laser light generator and the aperture permitting a beam of laser light generated by the laser light generator to emanate outside the cavity when the laser light generator is housed therein, the emanation being in a plane that is substantially perpendicular to the substantially straight line of the edge that adjoins the second lateral surface to the bottom surface;
    wherein the first lateral surface forms a rectangular notch and wherein the housing is situated within the rectangular notch and adjoined to a first side of the rectangular notch via a first peg and to a second side of the rectangular notch via a second peg and is pivotably and vertically rotatable about an axis defined by the first and second pegs such that a front of the housing may be extended down through the rectangular notch below the bottom surface.

8. The apparatus of claim 7, wherein the housing is cylindrical shaped and is situated within the rectangular notch such that an axis of the cylindrical shaped housing aligns with a center of the edge that adjoins the second lateral surface to the bottom surface.

9. The apparatus of claim 8, wherein the top surface is substantially level and the cylindrically shaped housing has a diameter that is smaller than a height of the first lateral surface.

10. The apparatus of claim 7, wherein the housing is pivotably and vertically rotatable three-hundred and sixty degrees about the axis defined by the first and second pegs.

11. The apparatus of claim 7, wherein the top surface of the plate is substantially level.

12. The apparatus of claim 7, wherein the top surface and the bottom surface are substantially semicircular in shape and the first lateral side is curved.

13. The apparatus of claim 7, wherein the top surface and the bottom surface are both substantially shaped as:
    a triangle, a square, a rectangle, a hexagon, an octagon, a decagon, a semi-hexagon, a semi-octagon, or a semi-decagon.

14. The apparatus of claim 7, wherein the second lateral surface is beveled such that an angle between the second lateral surface and the bottom surface is less than ninety degrees thereby enabling the edge to be placed substantially flush against the vertex.

15. The apparatus of claim 7, further comprising the laser light generator.

16. The apparatus of claim 15, wherein the laser light generator generates a green beam of laser light.

17. A method for using an apparatus to determine a direction in which a tree will fall, the apparatus including a plate comprising a straight edge and a laser light generator pivotably connected to the plate to enable rotation of the laser light generator in a vertical plane that is perpendicular to the straight edge, the laser light generator generating a beam of laser light in a plane that is substantially perpendicular to the straight edge, the method comprising:

identifying a desired direction for the tree to fall;
cutting a notch into the tree based on the desired direction;
placing the apparatus so that the straight edge of the plate is substantially flush with a vertex of the notch;
rotating the laser light generator in the vertical plane to point in a direction below a horizontal; and
determining an actual direction in which the tree will fall by finding where the beam of laser light is pointing.

18. The method of claim 17, further comprising:
determining that the desired direction and the actual direction are not the same; and
based on the determinization, modifying the notch in the tree.

19. The method of claim 17, wherein the determining where the actual direction in which the tree will fall by finding where the beam of a laser light is pointing includes:
moving away from the tree substantially in a direction in which the notch faces; and
reflecting the beam of laser light off a surface.

* * * * *